Aug. 14, 1951     R. A. HANSON     2,564,202
LEVELING DEVICE

Filed June 29, 1945     2 Sheets—Sheet 1

Inventor
Raymond Alvah Hanson

By Clarence A. O'Brien
and Harvey B. Jacobson
Attorneys

Aug. 14, 1951
R. A. HANSON
2,564,202
LEVELING DEVICE
Filed June 29, 1945
2 Sheets-Sheet 2
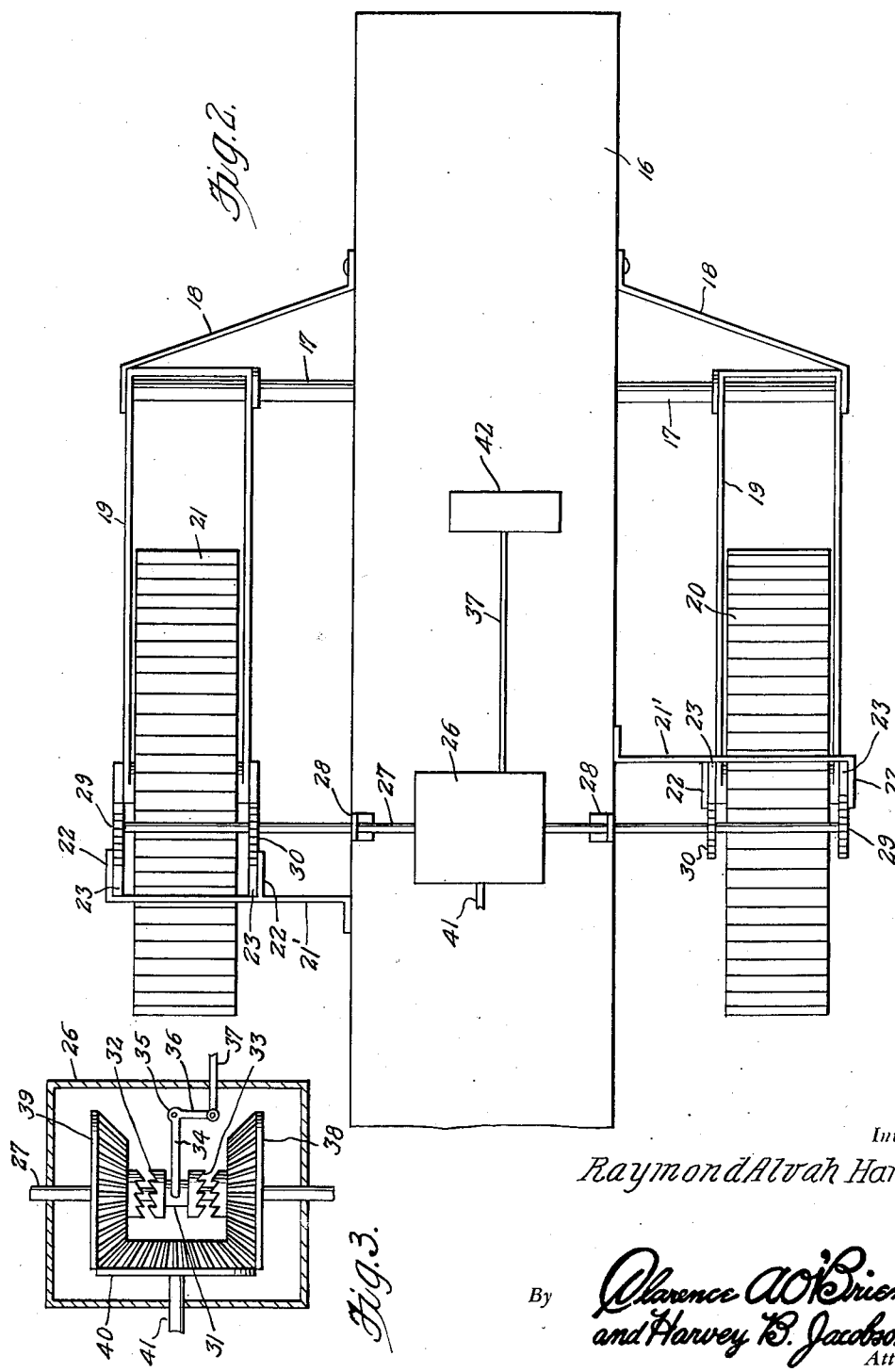
Inventor
Raymond Alvah Hanson
By Clarence A. O'Brien
and Harvey B. Jacobson
Attorneys Patented Aug. 14, 1951

2,564,202

UNITED STATES PATENT OFFICE 2,564,202

LEVELING DEVICE

Raymond Alvah Hanson, Palouse, Wash., assignor of one-third to Ray Hanson, Palouse, Wash.

Application June 29, 1945, Serial No. 602,317

1 Claim. (Cl. 280—6)

This invention relates to a leveling device for vehicles such as a harvesting machine, or other machine, which is moved forwardly across a field when in use and must be kept substantially horizontal in order to operate properly.

One object of the invention is to provide a vehicle having a body which is tiltable transversely and has wheels at opposite sides and is equipped with an improved arrangement of vertically extending rack bars meshing with pinions carried by a shaft which is rotatably mounted transversely of the vehicle body and adapted to be selectively rotated in predetermined directions so that as it is turned one side of the vehicle will be raised and the other moved downwardly. It will thus be seen that when using the machine for side hill harvesting or the like, its body portion may be readily tilted transversely and held in a horizontal position.

Another object of the invention is to provide leveling mechanism including an improved arrangement of gears and a clutch which is shiftable to adjusted positions for selectively causing rotation of the pinion-carrying shaft in predetermined directions, the said clutch being moved by mechanism including a bell crank lever and a rod which is shifted longitudinally of the vehicle and thereby moves the bell crank lever about its pivot to shift the clutch.

Another object of the invention is to provide leveling mechanism wherein the lever operating the rod may be automatically shifted longitudinally in response to transverse tilting of the machine as the machine moves across a hilly or uneven field.

The invention is illustrated in the accompanying drawings wherein:

Fig. 2 is a top plan view.

Fig. 3 is a sectional view, upon an enlarged scale, taken horizontally through the gear box of the leveling mechanism.

Figure 1:
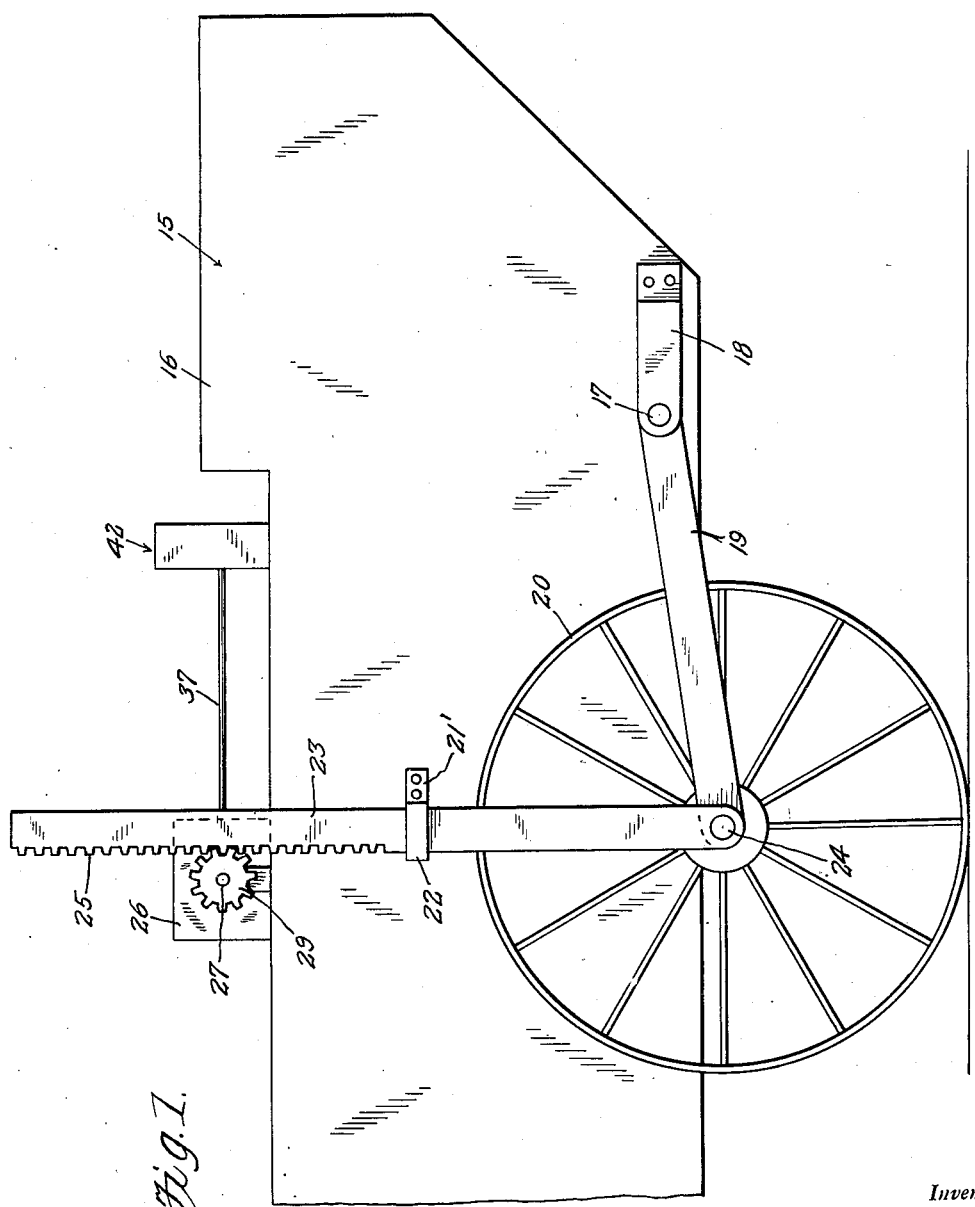
Fig. 1 is a side view of a farm implement equipped with the improved leveling mechanism.

Referring to the drawings in detail, a farm implement designated generally 15, which may be a harvester, combine or other type of farm machine which must operate at all times in a horizontal plane, comprises a body 16 to which is attached a transversely extending bar 17, the outer ends of which are supported in suitable brackets 18. Mounted on opposite ends of this bar on opposite sides of the body 16 are U-shaped yokes 19 between which the ground wheels 20 and 21 are rotatably mounted. It is understood, of course, that the yokes 19 are pivoted to the bar 17 so as to swing in a vertical plane about the horizontal axis of the bar. Extending outwardly from the sides of the body 16 on opposite sides are brackets 21' carrying guide yokes 22 in which vertically sliding bars 23 are supported. The lower ends of these bars are attached to the axles 24 about which the wheels 20 and 21 turn, while the upper ends of the bars project beyond the top of the body 16 and are provided along their edges with rack teeth 25. As illustrated in Figure 2, the bars 23 which are associated with the wheel 20 are arranged so that the rack teeth 25 thereon face in a direction opposite the teeth 25 on the bars 23 which are associated with the ground wheel 21. Arranged on the top of the body 16 between the bars 23 is a gear housing 26 through which a transversely extending shaft 27 projects from opposite sides. This shaft is mounted to rotate in brackets 28 attached to the top of the body 16 and carries at its extreme end pinions 29 which have meshing engagement with the rack teeth 25 of the bars 23. Similar pinions 30 are carried by the shaft 27 in spaced relation to the pinions 29 and have meshing engagement with the rack teeth on the inner bars 23, i. e., those on the insides of the wheels 20 and 21. Keyed to the shaft 27 for longitudinal sliding motion thereon intermediate its ends and within the housing 26 is a clutch collar 31 having teeth 32 and 33 at opposite ends. This clutch collar is provided intermediate its ends with a groove for the reception of an operating fork 34 pivoted, as at 35, and carrying an arm 36 to which a link 37 is pivoted. Mounted for independent rotation on the shaft 27 on opposite sides of the clutch collar 31 are beveled pinions 38 and 39 which have meshing engagement with a beveled drive pinion 40 carried at the end of a drive shaft 41 which is continuously driven from any suitable source of power. From the foregoing it will be obvious that by shifting the clutch collar 31 longitudinally on the shaft 27, the clutch teeth 32 or 33 will be moved into engagement with the pinions 39 or 38, respectively, depending on the direction in which the clutch collar is moved, so as to cause the shaft to revolve with one or the other of such pinions, and in this way the rotation of the shaft 27 may be governed by merely moving the link 37 longitudinally of the body 16. A box or housing 42 is mounted forwardly of the gear housing and into this housing 42 extends the front end portion of the shaft 37. Any automatic mechanism devised for imparting longitudinal movement to the shaft 37 is mounted within the housing 42 and serves to effect movement of the bell crank lever 36 about its pivot when the forming implement is tilted transversely by uneven places in a field or by variations in the slope of hilly ground across which the implement is moved while in use.

The operation of the device is believed to be obvious from the description previously employed in setting out the details disclosed in the drawings, and it is apparent that the invention herein disclosed provides a control by means of which the leveling equipment of the apparatus upon which it is used can be easily regulated.

While in the foregoing there has been shown and described the preferred embodiment of this invention, it is to be understood that minor changes in the details of construction, combination and arrangement of parts may be resorted to without departing from the spirit and scope of the invention as claimed.

I claim:

In a vehicle including a body, yokes extending longitudinally of the vehicle at each side thereof and pivoted for vertical tilting movement, wheels rotatably carried by said yokes, and rack bars extending vertically from the yokes and forward with teeth along edge faces; mechanism for leveling the body comprising a shaft rotatably mounted across the body transversely thereof, pinions carried by said shaft and meshing with the teeth of said rack bars, the teeth of the rack bar at one side of the body being across its front face and the teeth of the bar at the opposite side of the body being across its rear face whereby the bars move in opposite directions during rotation of the shaft, a rotary drive shaft extending longitudinally of said body and carrying a beveled gear, beveled gears loose upon the first shaft and meshing with opposite side portions of the gear carried by the drive shaft, a clutch slidable along the first shaft between the gears thereon into selective gripping engagement with the beveled gears thereon for rotating the first shaft in selected directions, a lever for moving said clutch to adjusted positions, and means for actuating the lever to shift the clutch along the first shaft into engagement with a selected one of the gears thereon and cause rotation of the first shaft in a predetermined direction to effect leveling of the body.

RAYMOND ALVAH HANSON.

REFERENCES CITED

The following references are of record in the file of this patent:

UNITED STATES PATENTS

| Number | Name | Date |
| --- | --- | --- |
| 705,731 | Ach | July 29, 1902 |
| 905,985 | Clove | Dec. 8, 1908 |
| 1,262,829 | Neumeier | Apr. 16, 1918 |
| 1,558,567 | Schein | Oct. 27, 1925 |
| 1,909,918 | Tanner | May 16, 1933 |
| 2,101,837 | Blanchett | Dec. 14, 1937 |
| 2,202,009 | Knox et al. | May 28, 1940 |
| 2,359,961 | Anthony | Oct. 10, 1944 |